United States Patent [19]
Dugge et al.

[11] Patent Number: 5,158,022
[45] Date of Patent: Oct. 27, 1992

[54] HATCH VENT ASSEMBLY FOR RAILROAD CARS WITH BAFFLE AND SCREEN MESH TO PREVENT ENTRY OF CONTAMINANTS

[75] Inventors: Richard A. Dugge, DesPeres; William U. Casseau, St. Louis; John A. Krug, St. Charles, all of Mo.

[73] Assignee: ACF Industries, Inc., Earth City, Mo.

[21] Appl. No.: 695,902

[22] Filed: May 6, 1991

[51] Int. Cl.$^5$ .............................................. B61D 39/00
[52] U.S. Cl. ................................... 105/377; 220/314; 220/367
[58] Field of Search ............... 105/377; 220/249, 314, 220/367, 370, 374

[56] References Cited

U.S. PATENT DOCUMENTS

| | | | |
|---|---|---|---|
| 497,961 | 5/1893 | Ilgen | 220/370 |
| 4,127,216 | 11/1978 | Martin, Jr. et al. | 220/374 |
| 4,151,929 | 5/1979 | Sapien | 220/367 X |
| 4,248,160 | 2/1981 | Carney, Jr. et al. | 220/314 X |
| 4,541,544 | 9/1985 | Martin, Jr. et al. | 220/374 |
| 4,609,126 | 9/1986 | Janda | 220/367 X |
| 4,819,830 | 4/1989 | Schultz | 105/377 X |

FOREIGN PATENT DOCUMENTS

| | | | |
|---|---|---|---|
| 245246 | 9/1962 | Australia | 220/367 |
| 270215 | 11/1950 | Switzerland | 220/44 |

Primary Examiner—Robert J. Oberleitner
Assistant Examiner—Joseph Morano
Attorney, Agent, or Firm—Polster, Lieder, Woodruff & Lucchesi

[57] ABSTRACT

A hatch cover assembly includes a vent passageway through a hatch cover for venting the interior of a railroad hopper car, or the like, to the environment. The hatch cover is held in closed position by a locking strap, and the vent passageway is located directly beneath the locking strap to help prevent rain and other environmental contaminants from passing through the vent passageway. An inexpensive baffle assembly is releasably clipped into the vent passageway beneath the locking strap and is comprised of a two piece molded plastic structure with a mesh screen held therebetween to further protect the vent passageway from contaminants.

13 Claims, 2 Drawing Sheets

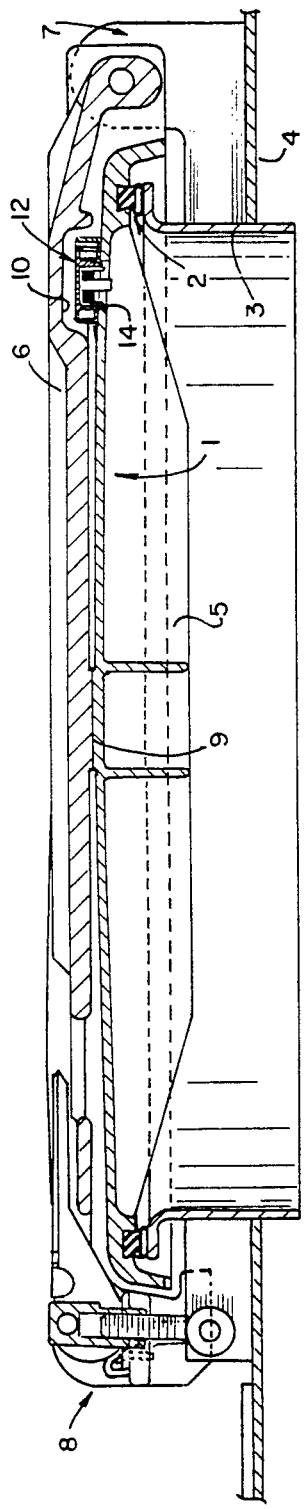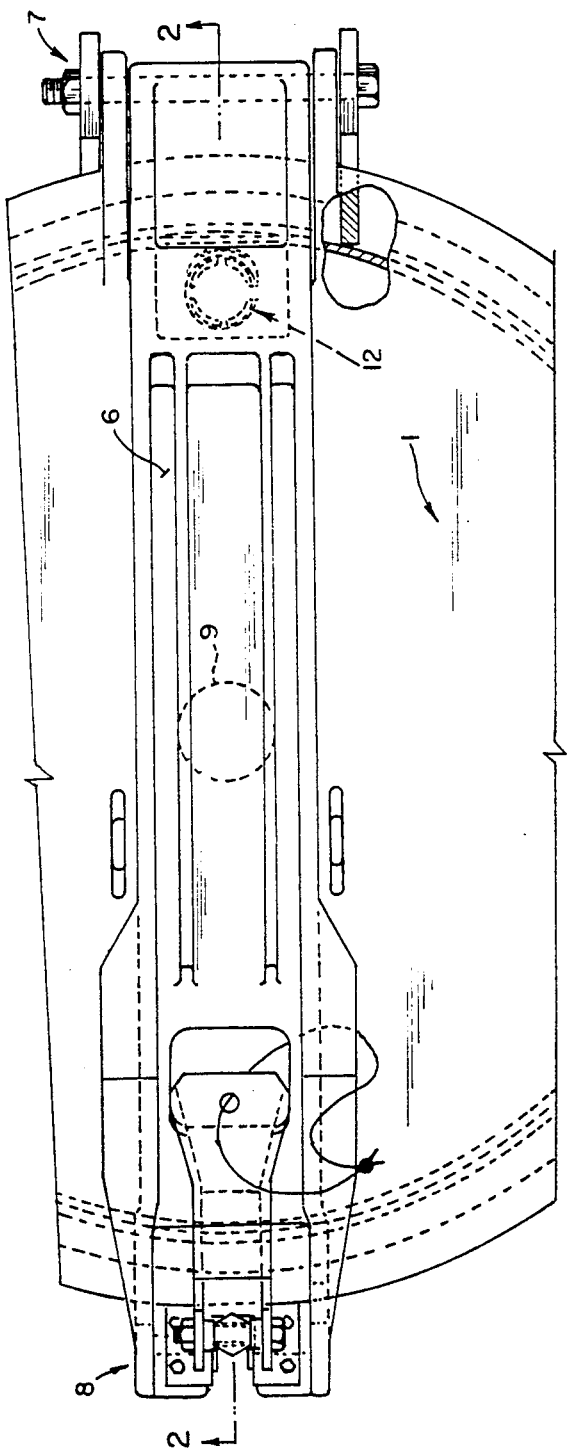

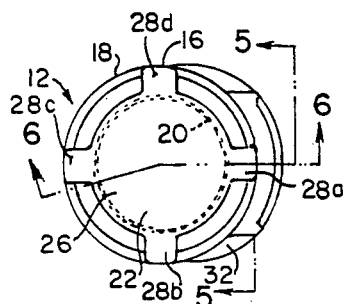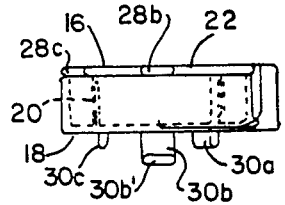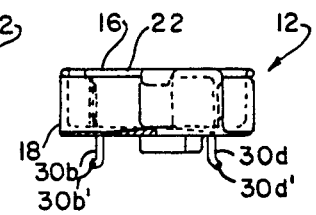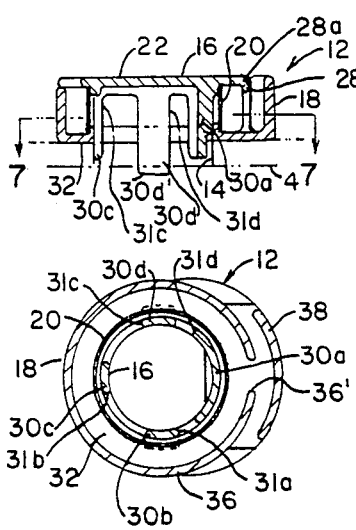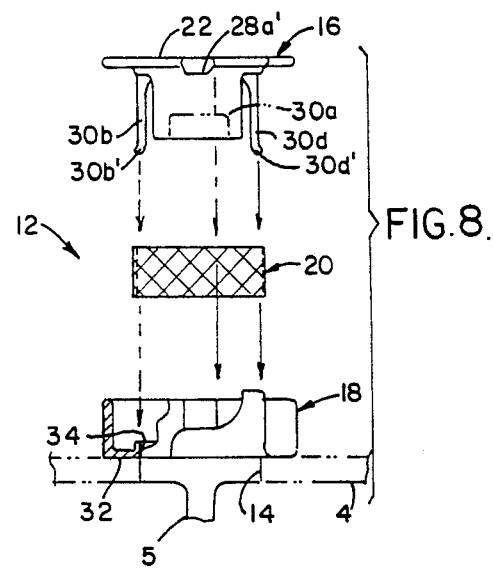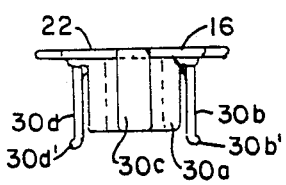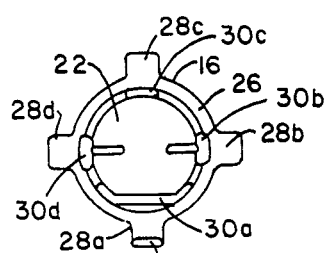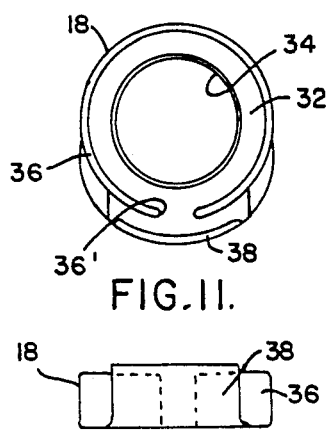

1

HATCH VENT ASSEMBLY FOR RAILROAD CARS WITH BAFFLE AND SCREEN MESH TO PREVENT ENTRY OF CONTAMINANTS

BACKGROUND OF THE INVENTION

The invention relates to hatch vent assemblies and more particularly to a hatch cover vent assembly for use on covered hopper railway cars, and the like, used to carry various types of lading. Such railway cars typically have a number of hoppers into which lading is loaded through an opening or hatchway in the roof of the car. The hatchway is provided with a hatch cover, typically circular, which is adapted to be sealed in an airtight manner with a circular coaming at the top of the hatchway. In order to seal and latch the hatch cover in place there is typically provided a locking strap or arm which extends across the hatch cover to exert a downward force thereon and which can be locked to prevent tampering with the lading. In some cases, it is desirable to provide an air vent to the interior of the hopper car in order to prevent the build up of pressure differentials within the sealed hopper. These pressure differentials may develop due to temperature changes within the hopper during transport and other causes.

It is important that the vent be constructed in such a way as to prevent environmental containments from entering into the hopper and possibly ruining the lading. The most commonly encountered environmental contaminants are rain and snow; however, wind borne solids such as plant seeds and insects must also be prevented from entering the hopper through the air vent.

It is well known to provide an air vent passage through a hatch cover of a hopper car. An example of such a prior art vent structure for a hopper car is shown in U.S. Pat. No. 4,819,830, the disclosure of which is incorporated herein by reference. Other vent structures are shown in U.S. Pat. Nos. 4,127,216 and 4,609,126.

The vent structures of the prior art have been somewhat complicated, bulky and relatively expensive to manufacture, since a great deal of metal materials are used to construct the vent.

SUMMARY OF THE INVENTION

It is an object of the invention to provide a hatch vent assembly which is simple and inexpensive to manufacture and which can be installed in a hatch cover in a facile manner.

It is another object of the invention to provide a hatch vent assembly which can be easily removed from the hatch for repair, cleaning or replacement.

It is a still further object of the invention to provide a hatch vent assembly which alleviates the possibility of environmental contaminants entering through the vent passageway, and which utilizes existing hatch structure as part of the protection against environmental contamination.

According to the present invention, a vent passageway is formed through the hatch cover. A simple injection molded plastic baffle structure, preferably formed of only two separable parts, is removably secured in the vent passageway by means of a unitarily formed clip structure. The baffle structure prevents rain and other environmental contaminants from passing into the hopper through the vent passageway, while a mesh screen member removably held within the baffle structure further ensures that solid contaminants will not pass through the vent passageway. Preferably the vent baffle structure is positioned in a protected area directly beneath the locking strap for the hatch cover, thereby utilizing the locking strap as further protection from environmental contamination of the lading through the vent passageway.

Preferably, the invention includes a hatch cover adapted to close a hatchway. A vent passageway is provided through the hatch cover for venting the interior of the hatchway to the exterior of the hatchway. Baffle structure communicates with the passageway for preventing environmental contaminants from passing through the baffle structure and through the vent passageway. A locking strap is moveable between a hatch cover closing and locking position and a hatch cover opening and unlocking position. The vent passageway is located beneath the locking strip when the locking strap is in the hatch cover closing and locking position such that the locking strap further protects the vent passageway from environmental contamination.

The several objects and advantages of the present invention will become more readily apparent upon a reading of the detailed description of a preferred embodiment thereof in conjunction with the drawings wherein:

BRIEF DESCRIPTION OF THE DRAWINGS

FIG. 1 is a top plan view of the mid-portion of a hatch cover vent assembly according to the present invention;

FIG. 2 is a cross sectional view of the hatch cover assembly taken along line 2—2 of FIG. 1;

FIG. 3 is a top plan view of a baffle vent assembly according to the present invention;

FIG. 4 is a front elevational view of the baffle vent assembly;

FIG. 5 is a side view taken along line 5—5 of FIG. 3;

FIG. 6 is a cross sectional view taken along line 6—6 of FIG. 3;

FIG. 7 is a cross sectional view taken along line 7—7 of FIG. 6;

FIG. 8 is an exploded side view of the baffle vent assembly;

FIG. 9 is a side elevational view showing the opposite side of a top member per se of the baffle vent assembly;

FIG. 10 is a bottom plan view of the top member per se;

FIG. 11 is a top plan view of the bottom member per se of the baffle vent assembly; and FIG. 12 is a side elevational view of the bottom member.

DETAILED DESCRIPTION OF A PREFERRED EMBODIMENT

With reference to the drawings, and FIGS. 1 and 2 in particular, there is shown a hatch cover generally referred to by the numeral 1 adapted to engage in an air tight manner the coaming seal 2 of a hatchway 3 secured to the top of a railway hopper car 4. While hatch cover 1 is shown cut away in FIG. 1, it should be understood that it is circular in top plan view and seals with circular coaming seal 2 around the entire mating periphery therebetween. Hatch cover 1 is typically formed of cast metal, but may be fabricated of high density plastic and includes reinforcing rib 5 extending diametrically across the underside of hatch cover 1. The general construction and operation of the hatch cover is described in the co-assigned U.S. Pat. No. 4,248,160, the disclosure of which is incorporated by reference herein.

When in the closed position over hatchway 3, hatch cover 1 is secured in place by a metal locking strap 6. Both hatch cover 1 and locking strap 6 are pivotally mounted to hinge assembly 7 secured to the top of hopper car 4. Locking strap 6 extends diametrically across the top of hatch cover 1 and is releasably latched to a locking mechanism 8 affixed to the top of hopper car 4 on the opposite side of hatch cover 1. It is noted that the underside of locking strap 6 bears against the top of hatch cover 1 only on a central circular bearing surface 9 in order that the periphery of hatch cover 1 will exert equalized pressure around the periphery of coaming seal 2 as is known in the art.

When hatchway 3 is to be opened, locking mechanism 8 is unlatched in a known manner and locking strap 6 is pivoted upward on hinge assembly 7 releasing the downward pressure exerted upon hatch cover 1 on bearing surface 9. Thereafter, or simultaneously, hatch cover 1 may be pivoted upward on hinge assembly 7 to thereby open hatchway 3. In the preferred embodiment, locking strap 6 runs along the longitudinal center line of the top of railroad hopper car 4.

The underside of locking strap 6 is formed to include, adjacent the hinged end thereof, a covered vent cavity 10 within which is located a vent baffle assembly 12. Baffle assembly 12 communicates with a circular vent passageway 14 formed in hatch cover 1 just beneath cavity 10 of locking strap 6. It can be seen in FIG. 2 that ambient air may communicate with cavity 10, baffle assembly 12, vent passageway 14 and the interior of hatchway 3 since locking strap 6 bears against the top of hatch cover 1 only at central bearing surface 9, thus leaving an air gap between locking strap 6 and hatch cover 1 at all other locations. It can also be appreciated that locking strap 6 acts as a significant shield for vent passageway 14 and baffle assembly 12 in preventing rain and snow from directly impinging within cavity 10.

As best seen in FIGS. 3-12, baffle assembly 12 includes a top member 16, a bottom member 18 and a mesh screen member 20. Top member 16 and bottom member 18 are preferably formed of injection molded plastic while the mesh screen member 20 is formed of woven stainless steel wire or nylon screen material.

Top member 16 includes a generally horizontal top wall 22 extending above vent passageway 14. Top wall 22 includes a generally circular center portion 26 and four finger portions 28a, 28b, 28c, 28d extending radially outwardly from center portion 26 at ninety degree intervals. One of the finger portions 28a includes a downwardly directed lip 28a' for reasons to be explained hereinafter. Extending downwardly from top center portion 26 of top member 22 are four generally vertical walls 30a, 30b, 30c, 30d spaced around within a generally circular pattern and having horizontal passageways 31a, 31b, 31c, 31d therebetween as best seen in FIG. 7. All of vertical walls 30a, 30b, 30c, 30d are sized and positioned to snuggly pass into vent passageway 14 for holding top member 16 from horizontal movement with respect to vent passageway 14. Diametrically opposed walls 30b and 30d act also as integral clip fingers having radially outwardly directed cam lobes 30b' and 30d', respectively. When clip fingers 30b and 30d are inserted down into vent passageway 14, lobes 30b' and 30d' will act to slightly bend fingers 30b and 30d radially inwardly until lobes 30b' and 30d' pass through the vertical thickness of vent passageway 14 at which time fingers 30b and 30d will spring back to their original position and top member 16 will be held in vent passageway 14 from vertical movement. However, by use of a prying instrument such as a screwdriver top member 16 may be popped up out of vent passageway 14.

Bottom member 18 includes a generally horizontal bottom wall 32 having a generally circular passageway 34 therethrough sized to overlie and be coincident with vent passageway 14. Extending upwardly from bottom wall 32 is a generally circular vertical wall 36 having a single horizontal passageway 36' therein. Also extending upwardly from bottom wall 32 is vertical wall 38 spaced radially outwardly from wall 36 and positioned to block direct linear horizontal access to passageway 36'. A short upstanding circular lip 40 is provided around passageway 34.

Mesh screen member 20 is formed as a cylinder with an inside diameter sized to fit snuggly around wall members 30a, 30b, 30c, 30d of top member 16 and circular lip 40 of bottom member 18.

When baffle assembly is in place, bottom member circular passageway 34 overlies vent passageway 14 in hopper car top 4. Screen 20 is held from horizontal movement with respect to bottom member 18 over vent passageway 14 by lip 40. Top member vertical walls pass within screen 20 to further secure screen 20 and project downwardly through vent passageway 14 where clip finger lobes 30b' and 30d' secure the entire baffle assembly 12 in place over vent passageway 14. Lip 28a' of finger 28a on top wall 22 of top member 16 engages with the top of passageway 36' of bottom member 18 to prevent angular displacement between top member 16 and bottom member 18. Vertical wall 30a of top member 16 blocks any direct linear horizontal passage of contaminants from passageway 36' and thus the combination of vertical walls 38, 36 and 30a provide a tortuous path through which it is difficult for contaminants such as rain to pass through. Further, screen 20 will block and hold solid contaminants such as air borne seeds and insects and prevent entrance of same into vent passageway 14.

If screen 20 should become clogged, top member 16 may be pryed out from engagement with vent passageway 14 to either replace the entire baffle assembly 12 or just screen 20.

It can thus be seen that the preferred embodiment of the present invention achieves all of the objects and advantages set forth hereinabove.

As numerous changes could be made in the above preferred embodiment of the invention without departing from the scope of this invention, it is intended that all matter contained in the above-description or shown in the accompanying drawings shall be interpreted as illustrative and not in a limiting sense. For example, top wall 22 of top member 16 could extend completely over vertical wall 36 of bottom member 18, or vertical walls 30a, 30b, 30c, 30d could be integral with bottom member 18 and top member 12 would then clip onto the top of bottom member 18. The scope of the protection of this invention is to be determined solely by the language of the following claims, as interpreted according to the Doctrine of Equivalents.

What is claimed is:

1. A hatch cover assembly comprising:
    a hatch cover adapted to close a hatchway;
    a vent passageway through said hatch cover for venting the interior of said hatchway to the exterior of said hatchway;

vent means communicating with said passageway for preventing environmental contaminants from pouring through said vent passageway, said vent means including baffle means having a top member and a bottom member, said top member including a generally horizontal top wall means extending above said vent passageway, at least one top member generally vertical wall means having at least one horizontal passageway therethrough communicating ambient air with said vent passageway, and at least two clip fingers extending downwardly from said top wall means through said vent passageway, said clip fingers adapted to engage with said hatch cover to hold said baffle means securely in place; and said bottom member including at least one bottom member generally vertical wall means having at least one horizontal passageway therethrough communicating ambient air with said vent passageway, the top member and bottom member horizontal passageways being located such that any horizontal straight line will not pass through both of them;

a locking strap moveable between a hatch cover closing and locking position and a hatch cover opening and unlocking position; and, said vent passageway being so located beneath said locking strap when said locking strap is in said hatch cover closing and locking position such that said locking strap further protects said vent passageway from environmental contamination.

2. A hatch cover assembly as specified in claim 1 wherein:
said bottom member and said top member are formed of injection molded plastic.

3. A hatch cover assembly as specified in claim 1 wherein:
a screen mesh is positioned between said horizontal passageway in said top member and said horizontal passageway in said bottom member to prevent solid contaminants from passing into said vent passageway.

4. A hatch cover assembly as specified in claim 1 wherein:
said top member includes means for engaging with and holding said bottom member securely in place over said vent passageway.

5. A hatch cover assembly as specified in claim 1 wherein:
said bottom member includes a generally horizontal bottom wall means having a generally circular passageway therethrough, said circular passageway overlying and being generally coincident with said vent passageway;
said bottom member vertical wall means includes at least one generally vertical circular wall means extending upwardly from said horizontal bottom wall means;
a generally circular mesh screen means generally coaxial within said bottom member vertical circular wall means; and
said top member vertical wall means being located within said circular mesh screen means and passing through said bottom wall means circular passageway such that said top member helps secure said screen means and said bottom member in place.

6. A hatch cover assembly as specified in claim 5 wherein:
one of said top and bottom members includes a third vertical wall means positioned to prevent direct horizontal entry of contaminants through said horizontal passageway of said vertical circular wall means.

7. A hatch cover vent assembly comprising:
a hatch cover adapted to close a hatchway;
a vent passageway through said hatch cover for venting the interior of said hatchway to the exterior of said hatchway;
baffle means on said hatch cover communicating with said passageway for preventing environmental contaminants from passing through said baffle means and through said vent passageway;
said baffle means including a top member and a bottom member;
said top member including a generally horizontal top wall means extending above said vent passageway, and said top member including vertical wall means extending downwardly from said top wall means;
said top member vertical wall means including at least one horizontal passageway therethrough communicating ambient air with said vent passageway;
said top member including at least two clip fingers extending downwardly from said top member vertical wall means through said vent passageway, said clip fingers being adapted to engage with said hatch cover to hold said baffle means securely in place;
said bottom member including at least one horizontal passageway therethrough communicating ambient air with said vent passageway; and
said horizontal passageways being located such that any horizontal straight line will not pass through both said top member horizontal passageway and said bottom member horizontal passageway.

8. A hatch cover vent assembly as specified in claim 7 wherein:
said bottom member and said top member are formed of injection molded plastic.

9. A hatch cover vent assembly as specified in claim 7 wherein:
a screen mesh is positioned between said horizontal passageway in said top member and said horizontal passageway in said bottom member to prevent solid contaminants from passing into said vent passageway.

10. A hatch cover vent assembly as specified in claim 7 wherein:
said clip fingers engage with and hold said bottom member securely in place over said vent passageway.

11. A hatch cover vent assembly comprising:
a hatch cover adapted to close a hatchway;
a vent passageway through said hatch cover for venting the interior of said hatchway to the exterior of said hatchway;
baffle means communicating with said passageway for preventing environmental contaminants from passing through said baffle means and through said vent passageway;
said baffle means including a generally horizontal top wall means extending above said vent passageway and a plurality of baffle walls for preventing direct horizontal linear movement of environmental contaminants from entering into said vent passageway; and said baffle means including clip means for engaging said hatch cover and for securing said baffle means to said hatch cover;

said clip means including at least two clip fingers extending downwardly through said vent passageway; and said clip fingers being adapted to engage with said hatch cover to hold said baffle means securely in place.

12. A hatch cover vent assembly as specified in claim 11 wherein:

said clip fingers being releasable from said hatch cover to permit said baffle means to be removed from and replaced on said hatch cover, in order to clean, maintain, and replace said baffle means.

13. A hatch cover vent assembly as specified in claim 11 wherein:

said baffle means includes mesh screen means for preventing solid environmental contaminants from entering said vent passageway.

* * * * *